United States Patent

Goldfein et al.

[11] Patent Number: 5,044,302
[45] Date of Patent: Sep. 3, 1991

[54] BRAKE WEAR INDICATOR

[75] Inventors: Nathan L. Goldfein; Frank J. Sonzala, both of Houston, Tex.

[73] Assignee: LGS Research, Inc., Houston, Tex.

[21] Appl. No.: 545,408

[22] Filed: Jun. 29, 1990

[51] Int. Cl.$^5$ .................. G01D 21/00; F16D 66/02
[52] U.S. Cl. ............................ 116/208; 116/283; 188/1.11
[58] Field of Search .............. 116/208, 281–283; 188/1.11; 340/453, 454

[56] References Cited

U.S. PATENT DOCUMENTS

| | | | |
|---|---|---|---|
| 1,418,210 | 5/1922 | Souther | 116/283 |
| 3,190,383 | 6/1965 | Fountain | 116/283 X |
| 3,298,466 | 1/1967 | Ayers et al. | 188/1.11 |
| 4,279,214 | 7/1981 | Thorn | 116/208 |
| 4,499,976 | 2/1985 | Weber | 188/71.9 |
| 4,757,300 | 7/1988 | Sebalos | 340/454 |
| 4,770,044 | 9/1988 | Ferris | 73/744 |
| 4,776,438 | 10/1988 | Schandelmeier | 188/1.11 |
| 4,800,991 | 1/1989 | Miller | 188/1.11 |
| 4,879,964 | 11/1989 | Emerson, Jr. | 116/28 R |

FOREIGN PATENT DOCUMENTS 0265884  3/1950  Switzerland ............ 116/281

Primary Examiner—William A. Cuchlinski, Jr.
Assistant Examiner—W. Morris Worth
Attorney, Agent, or Firm—Guy McClung

[57] ABSTRACT

A brake wear indicator having a hollow cartridge clampable to a push rod of a brake and having an indicator member within the cartridge spring biased at one end and contractible with the brake housing or other stationary member of a vehicle. The indicator member being exposed upon actuation of the brake and movement of the push rod. Warning indicia on the indicator member being exposed after the push rod has been moved a predetermined distance.

1 Claim, 4 Drawing Sheets

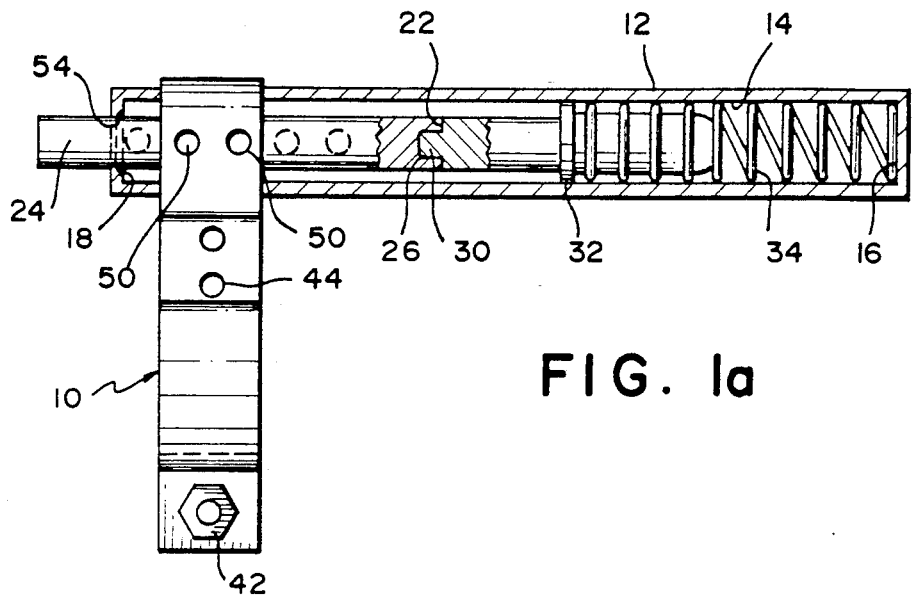
FIG. 1a
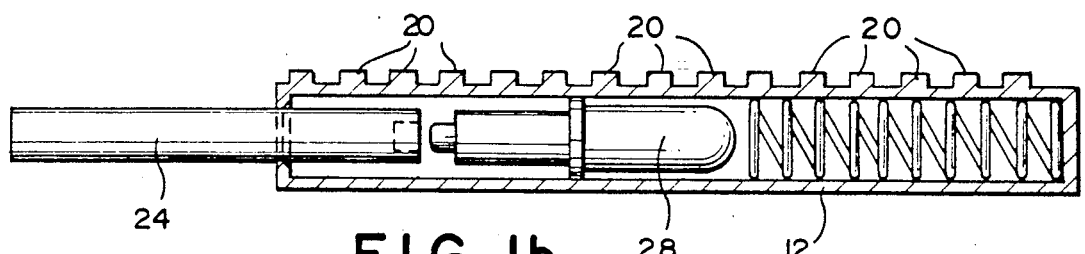
FIG. 1b
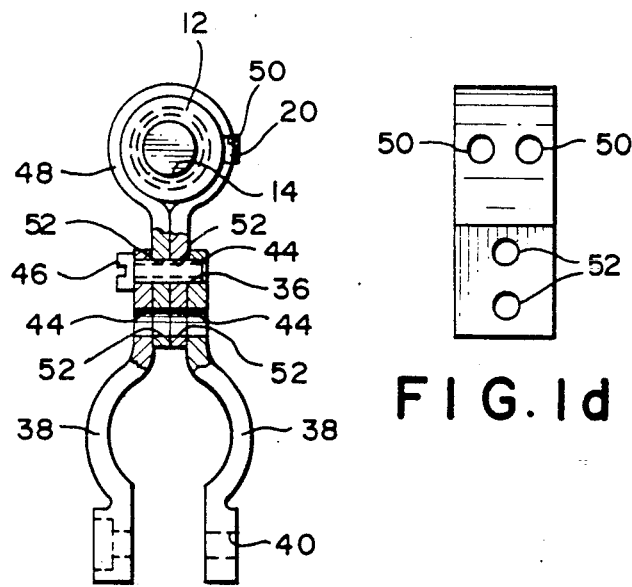
FIG. 1c
FIG. 1d
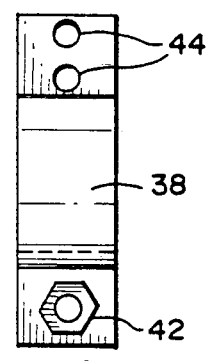
FIG. 1e

BRAKE WEAR INDICATOR

BACKGROUND OF THE INVENTION

1. Field of the Invention

This invention is directed to wear indicators for brakes, particularly air pressure actuated brakes or brakes actuated by a spring.

2. Description of Related Art

Common air-pressure-activated brakes have an actuator which includes an air pressure chamber and a flexible diaphragm or pistons linked mechanically to the brake by an actuator rod (called a "push rod"). The push rod is connected to a wedge, disc, cam or similar means which in turn is connected to the brake shoes (pads) The brake is actuated by the admission of air under pressure into the air pressure chamber or by releasing air off of a spring, forcing the diaphragm or piston to move and thereby moving the push rod. Movement of the push rod results in movement of the mechanism which in turn produces friction between the lining, disc, pad or drum to effect braking of the vehicle. A spring bearing against the push rod returns it to its normal non-braking position when the air pressure on the diaphragm or piston is relieved or air pressure is applied to compress or release a parking spring.

The distance a push rod travels is called its stroke. Push rod stroke distance can be altered in a variety of ways; e.g. brake shoes out of adjustment, worn brake shoes, or worn brake linings. When a push rod moves a relatively excessive amount, brakes should be adjusted or the shoes or linings be replaced. Brake shoes can become so worn that even when a push rod moves a maximum allowable distance, the shoes do not adequately contact the drums or discs to stop the vehicle. Such brake failure results in costly accidents, physical injury, and lost lives.

Common practices for checking brake wear include one person actually observing the travel of the push rod while someone else applies the brakes or forcibly extending the push rod against its return spring. A variety of solutions to the problem of indicating and inspecting push rod stroke have been attempted Nevertheless, brake failures still occur due to failure to note brake wear based on push rod stroke. The proposed devices are either difficult to inspect or too complex to be practical. Often indicators have been proposed which are exposed beneath a vehicle; hence they become covered with dirt and grime and, rather than having them cleaned off to obtain a good indication, they are ignored. Other indicators give false indications when brake drums have expanded due to heat, temporarily increasing the push rod stroke; i.e., the push rod moves to such a point that a wear indicator pops free even though there has been no excessive wearing of the shoes or linings. Other attempted solutions include devices which require that some part be inside the brake mechanism or which necessarily must be attached to a brake mounting bracket. Further attempts include devices which cannot be used when a boot or protector is used around the push rod. Many of the prior art indicators must be reset manually.

In accordance with 37 C.F.R. §1.56 the following are disclosed:

U.S. PATENTS 4,879,964 discloses a wear indicator having a chain attached to a push rod with a predetermined length corresponding to a first expanded position. A snap releases when the chain is extended too far, indicating excessive stroke. This indicator must be manually re-set and it can give a false indication when drums have expanded due to heat. The entire indicator is exposed and can become covered with mud and grease and it also requires attachment at two points, one fixed and one movable.

4,800,991 discloses a wear indicator which has a part that is released when the stroke is excessive. The released part hangs down for visual detection. This indicator must be manually re-set and hot drums could cause it to fall prematurely giving a false wear indication.

4,776,438 discloses a wear indicator mounted to a mounting bracket with an indicating bracket which must frequently be rechecked and re-set to verify correct wear indications. The indicator's parts are exposed and can become obscured by dirt or grime.

4,770,044 discloses a check gauge with a valve pin with colored zones that moves outwardly in response to pressure.

4,757,300 discloses a complex electronic indicator with a member permanently affixed to the brake housing which carries a switch which senses a magnet carried on a push rod and interconnected wiring and indicators.

4,499,976 discloses a slack adjuster for a disc brake.

4,279,214 discloses a two-piece indicator which snaps over a push rod and contacts the brake push plate in the interior of the housing. A boot would obscure such an indicator and it can become covered with mud and grime. It must be re-set manually.

3,298,466 discloses an indicator which is disposed within the brake housing in contact with the push rod push plate. A boot would cover such a device and such a device is not easily retrofittable. It is exposed beneath the vehicle and can become covered with dirt and grease.

Another prior art indicator simply consists of a knurl, groove, or mark on the push rod itself which may be colored, e.g. orange. When it becomes visible, that is an indication of excessive stroke, i.e. excessive wear. Such indicators are not retrofittable without brake disassembly and may not be usable with a boot.

There has long been a need for an efficient and effective brake wear indicator. There has long been a need for such an indicator which does not become obscured by foreign materials beneath a vehicle or by a boot on the push rod. There has long been a need for a brake wear indicator which re-sets itself automatically. There has long been a need for such a brake wear indicator which need not be in contact with the brake housing or bracket.

SUMMARY OF THE PRESENT INVENTION

The present invention is directed to brake wear indicators and, in one embodiment, includes an adjustable mounting bracket that is securable to a brake push rod, an indicator cartridge (of any shape, preferably cylindrical) and an indicator member partially disposed within the cartridge. The indicator member may be abutted against a brake housing or some other nearby object. In one embodiment a spring within the cartridge and biased against the indicator member pushes the indicator member against the housing or other object. When the push rod moves outwardly in one direction, the spring forces the indicator member out of the cartridge in the other direction. The cartridge protects and covers a portion of the indicator member until the push rod moves, exposing that portion. That portion of the indicator member may be colored orange or any easily discernible color or it can be marked in any easily detectable way, e.g. with bands or some other marking. The bracket can be emplaced on a portion of a push rod that is not covered by a boot or other protector. No portion of the indicator needs to extend into a brake housing and the indicator is automatically re-set when the brakes are de-activated. When the push rod stroke is excessively long, the marked or colored portion of the indicator member become visible. In another embodiment the indicator member may be connected to or adhesively secured to the brake housing or other adjacent member so that no spring is needed. Such indicators can be used with any type of brake (disc, drum, wedge) that has a push rod. In various embodiments, portions of the indicator can be made from materials (e.g. plastics) that are not easily attacked by corrosive substances. Brake wear indicators according to the present invention can be used with brakes that have push rods; e.g. air or mechanically (e.g. spring) actuated brakes. In one preferred embodiment, the cartridge is sized to clean an exposed wear indicator before it returns to the interior of the cartridge.

It is, therefore, an object of the present invention to provide a new, unique, effective, efficient and nonobvious brake wear indicator.

Another object of the present invention is the provision of a brake wear indicator in which a portion of the indicator is enclosed except when brakes are activated.

Yet another object of the present invention is the provision of such a brake wear indicator which need be attached only to a brake push rod.

A further object of the present invention is the provision of an indicator no portion of which needs to extend into a brake housing's interior.

An additional object of the present invention is the provision of such an indicator which does not need to be re-set manually and which may be self-cleaning.

Another object of the present invention is the provision of such an indicator wherein its mounting bracket and indicator member can be sized and configured to accommodate a range of different size brake housings and different types of brakes.

Yet another object of the present invention is the provision of such an indicator which can be used when a boot or protector surrounds the push rod.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

FIG. 1a is a side view in cross-section of a brake wear indicator according to the present invention. FIG. 1b is a side view in cross-section of a portion of the indicator of FIG. 1a showing an extended indicator member. FIG. 1c is a front view of the mounting bracket of the indicator of FIG. 1a. FIG. 1d is a side view of part of the bracket of FIG. 1a. FIG. 1e is a side view of a part of the bracket of FIG. 1c.

FIG. 6b is an end view of a clamp used with the part shown in FIG. 6a.

Figure 2A:
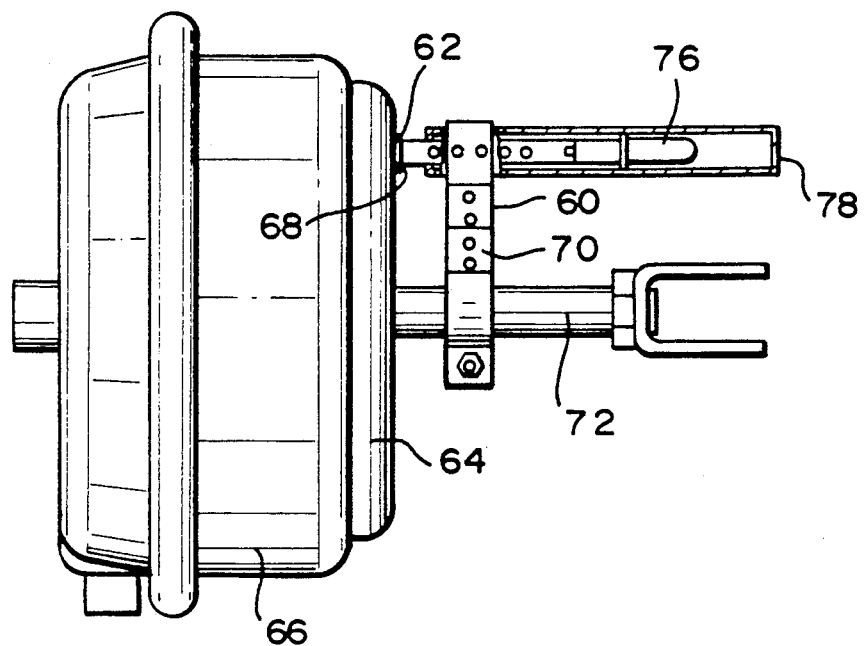
FIG. 2a shows an indicator as in FIG. 1a disposed on a brake push rod and abutting a brake housing with the brakes actuated but in adjustment.

DESCRIPTION OF EMBODIMENTS PREFERRED AT THE TIME OF FILING THE APPLICATION FOR THIS PATENT

Referring now to FIGS. 1a–1e, a brake wear indicator 10 according to the present invention has a hollow cylindrical cartridge 12 with an interior bore 14 having a first end 16, a second end 18, and a plurality of exterior nodules 20. Disposed within the bore 14 is an indicator member 22 which includes a first black portion 24 with a recess 26 in one end and a second orange portion 28 with a stinger 30 on one end and a flange 32. A spring 34 disposed in the bore 14 abuts the first end 16 of the bore and pushes against the flange 32 of the orange portion 28 of the indicator member 22. The stinger 30, in one embodiment, securably pops into and is held by the recess 26.

A bracket 36 includes two bottom pieces 38 having a bottom bolt hole 40 for receiving and holding a bolt 42 and having top bolt holes 44 for receiving a bolt 46 which passes through a top piece 48 which clamps around the cartridge 12. A plurality of holes 50 are provided in the top piece 48 for receiving one of the nodules 20 to insure a secure and firm mounting of the cartridge 12 in the bracket 36. The bolt 46 passes through the holes 44 in the bottom pieces 38 and through holes 52 in the top piece 48. By using other sets of holes adjustment in the bracket's position is provided.

The indicator 22 is movable within the bore 14 and through an end opening 54 in the cartridge 12. Because of the close fit between the indicator 22 and an opening 54 in the end 18 of the cartridge 12, foreign material adhering to a temporarily exposed portion of the indicator 22 is wiped off when the exposed portion returns within the cartridge 12.

Figure 2B:
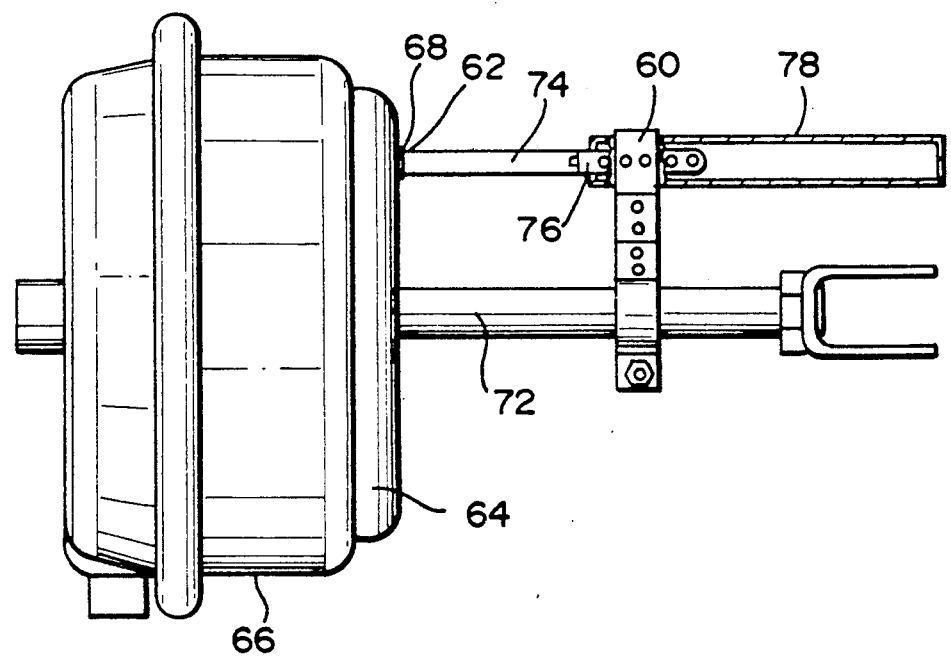
FIG. 2b shows the device of FIG. 2a with the brakes activated, the push rod extended, and brakes out of adjustment.

Referring now to FIGS. 2a and 2b a brake wear indicator 60 according to the present invention is like the indicator 10 but it has no spring. An end 62 of an indicator member 74 has been adhesively attached to a housing 64 of a brake 66 with adhesive 68. A clamp 70 of the indicator 60 has been secured to a push rod 72 of the brake 66.

As shown in FIG. 2a very little of the indicator member 74 is visible and the brake is not activated; i.e., the push rod is at zero stroke. A warning end 76 of the indicator 60 is completely enclosed within a cartridge 78. As shown in FIGS. 2b the brake has been actuated and the push rod has extended to such an extent that the warning end is now visible, indicating abnormal brake wear. Deactivation of the brakes will automatically return the push rod and indicator to the completely enclosed position. If the indicator member 74 is not glued, but a spring (like spring 34, FIG. 1b) is used, the indicator member 74 will remain in biased contact with the housing 64. The indicator 60 moves the same distance as the push rod 72.

Figure 3A:
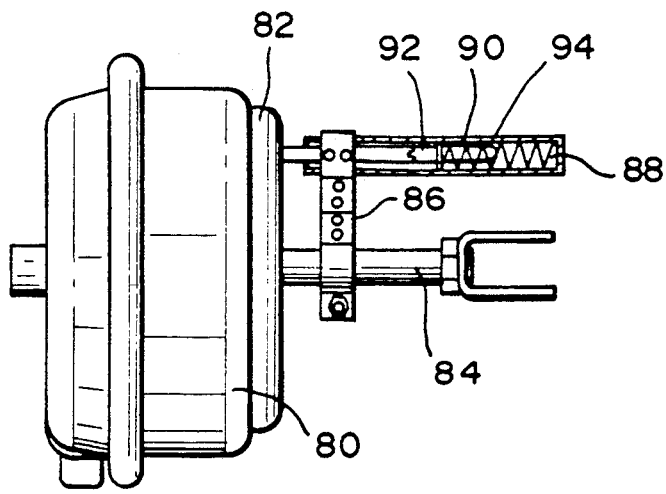
FIG. 3a shows an indicator as in FIG. 1a on a service brake with properly adjusted brakes.
Figure 3B:
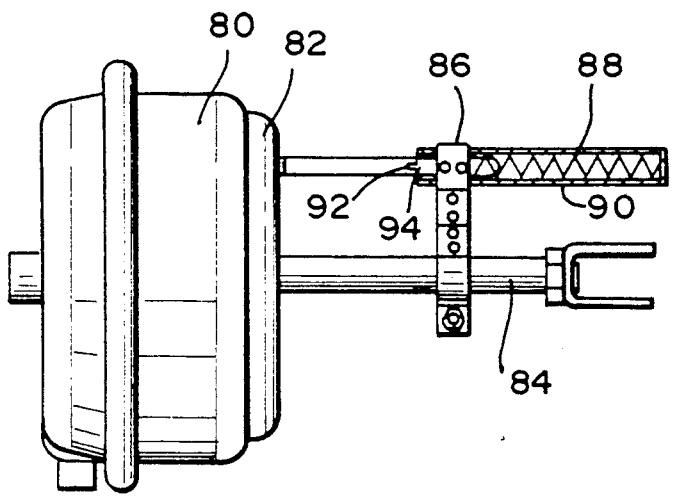
FIG. 3b shows a device as in FIG. 3a on a service brake with improper rod extension, i.e., with excessive wear.

As shown in FIGS. 3a and 3b, a brake 80 with a housing 82 and a push rod 84 has a wear indicator 86 secured to the push rod. The wear indicator 86 is like the previously described indicator 10 and utilizes a spring 88 in a cartridge 90 to maintain an indicator member 92 in contact with the housing 82. FIG. 3a shows a brake with an acceptable stroke; no portion of a warning end 94 of the indicator member 92 is visible. FIG. 3b shows this same brake after severe wear with an unacceptable stroke; i.e., a portion of the warning end 94 is now visible outside the cartridge 90.

Figure 4:
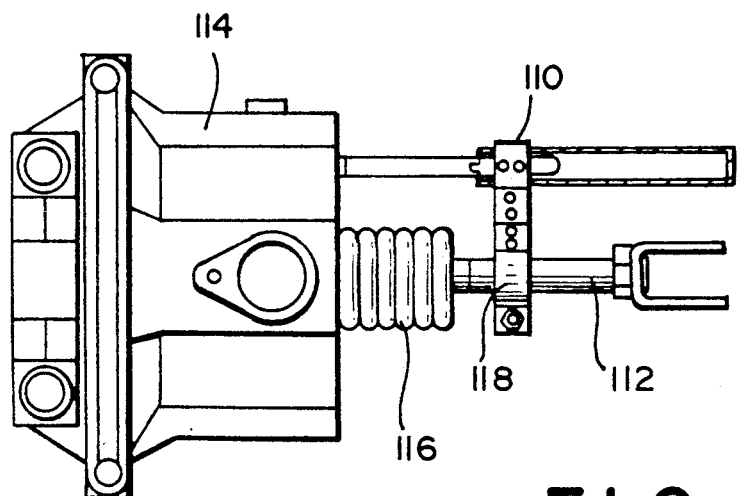
FIG. 4 shows an indicator as in FIG. 1a on a brake with a boot around its push rod.

FIG. 4 illustrates a brake wear indicator 110, like the indicator 60, secured on a push rod 112 of a brake 114. A protective boot 116 around the push rod 112 does not interfere with the indicator 110 which is securely clamped to the push rod 112 by a clamp 118.

Figure 5:
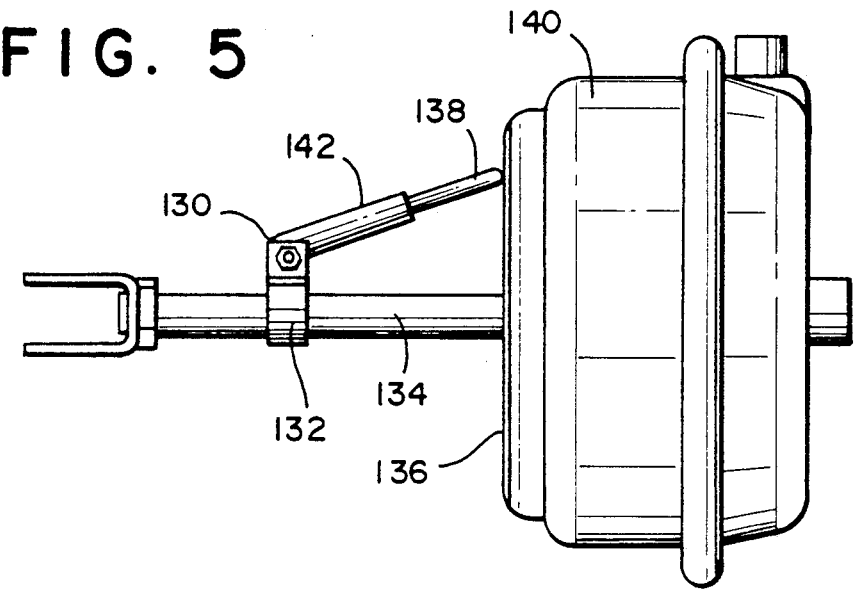
FIG. 5 shows a side view of an indicator according to the present invention used with a brake.

As shown in FIG. 5, a wear indicator 130 according to the present invention is secured with a clamp 132 to a push road 134 of a brake 136. The indicator 130 has a cartridge 142 and indicator 138 like the cartridge 12 and indicator 22 shown in FIG. 1 (with similar internal mechanisms). As the push rod 134 moves away from a housing 140 of the brake 136, the indicator 138 moves outwardly from the cartridge 142 to indicate the extent of the push rod stroke.

Figure 6A:
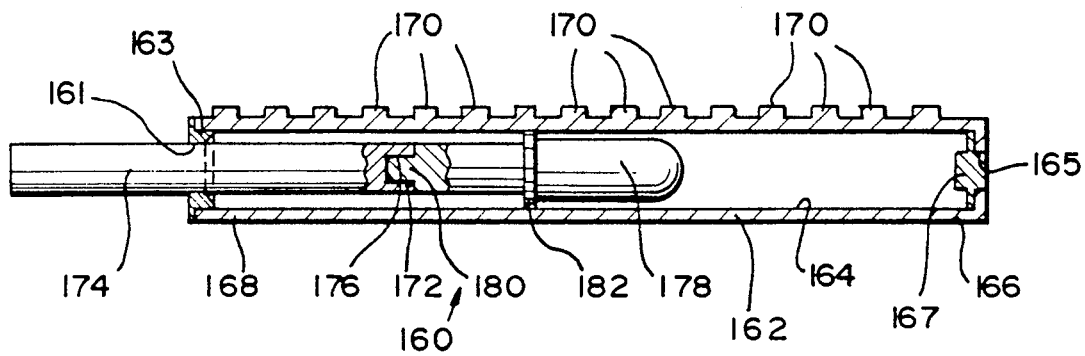
FIG. 6a is a side view in cross-section of part of a brake wear indicator according to the present invention.
Figure 6B:
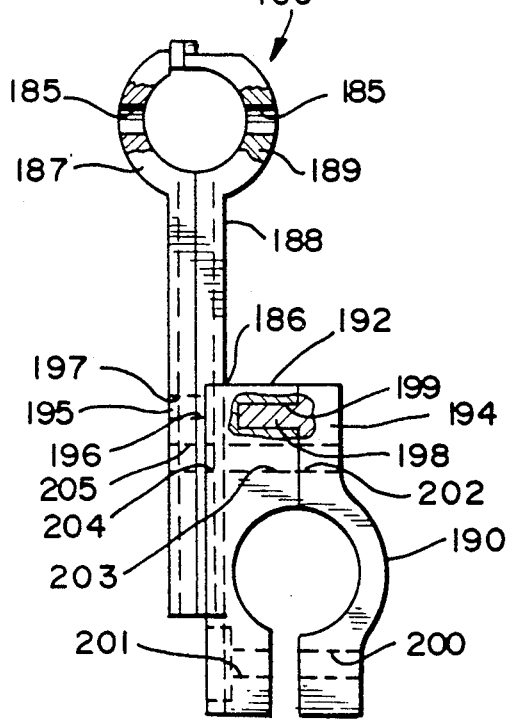

FIGS. 6a and 6b illustrate an alternative version of the indicator shown in FIGS. 1a-1e. An indicator 160 has a hollow cylindrical cartridge 162 with an interior bore 164 having a first end 166, a second end 168, and a plurality of exterior nodules 170. Disposed within the bore 164 is an indicator member 172 which includes a first black portion 174 with a recess 176 in one end and connected to it a second orange portion 178 with a stinger 180 on one end and a flange 182 which prevents the indicator from moving completely out of the cartridge 162. No spring is shown, but this embodiment may employ a spring like the spring 34 (FIG. 1a). An end piece 167 closes off an opening 165 in the first end 166 and an end piece 163, correctly sized to produce self cleaning of the indicator member 172, is disposed in the second end 168. The indicator member 172 passes through an opening 161 in the piece 163.

A bracket 186 has a top portion 188 and a bottom portion 190. The top portion 188 has two halves, 187 and 189, each with a hole 185 for receiving a nodule 170 to secure the cartridge 162 in place. A hole 191 in the half 187 receives a pin 193 formed integrally of the half 189 to help secure the two halves together.

The bottom portion 190 has two halves 192 and 194 which mate with the top portion 188. The half 192 has a pin 195 which extends through a hole 196 in the half 189 and through a hole 197 in the half 187 of the top portion 188. Similar holes can be provided along the length of halves 189 and 187 to provide adjustment of the position of top portion 188 with respect to bottom portion 190. The half 194 has a pin 198 which extends into a hole 199 in the half 192. A screw or bolt (not shown) is inserted through a hole 200 in the half 192 to secure the bottom portion 190 on a brake's push rod. By emplacing a bolt or screw (not shown) through holes 202, 203, 204 and 205 (in halves 194, 192, 189, and 187, respectfully) the bottom portion 190 is secured to the top portion 188. This also serves to clamp the top portion 188 about a cartridge like the cartridge 162.

Wear indicators according to the present invention may be used with fluid activated brakes (e.g. air) or spring applied brakes.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever for its principles may be utilized. The present invention is, therefore, well adapted to carry out the objects and obtain the ends and advantages mentioned, as well as other inherent therein.

What is claimed is:

1. A brake wear indicator for a brake having a push rod which is moved to move braking means into braking engagement, the brake mounted to a vehicle and having a brake housing, the indicator comprising a hollow cartridge, the hollow cartridge secured to the push rod by an adjustable clamp which clamps onto the push rod and onto the cartridge, an indicator member partially disposed in and movable with respect to the hollow cartridge, the indicator member having a first end with a warning portion, the warning portion normally disposed within the cartridge, the indicator member urged against a part of the vehicle by a spring within the hollow cartridge which yieldably urges the indicator against the part of the vehicle, the hollow cartridge securable to the push rod and having a second end through which the first end of the indicator member is freely movable, the first end of the indicator member urged against the part of the vehicle by the spring so that upon activation of the brake the push rod and the hollow cartridge move exposing a portion of the indicator member, to indicate amount of brake wear, the warning portion exposed in the event of abnormal brake wear, and the hollow cartridge second end having an opening sized so that a portion of the wear indicator exposed from within the hollow cartridge upon brake activation is cleaned of foreign material adhering to said exposed portion during its exposure when it returns within the cartridge.

* * * * *